United States Patent
Liu et al.

(10) Patent No.: US 6,247,767 B1
(45) Date of Patent: Jun. 19, 2001

(54) COMPUTER ENCLOSURE FOR EXCLUSIVELY MOUNTING TWO DIFFERENT SIZED SWITCHING POWER SUPPLIES

(75) Inventors: Alvin Liu, Pa-Li; Yun-Lung Chen, Chung-Ho, both of (TW)

(73) Assignee: Hon Hai - Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/337,864

(22) Filed: Jun. 21, 1999

(30) Foreign Application Priority Data

Sep. 11, 1998 (TW) .................................................. 87215103

(51) Int. Cl.7 .................................................. A47B 81/06
(52) U.S. Cl. .................................. 312/223.2; 312/265.6; 361/836
(58) Field of Search ............................. 312/223.1, 223.2, 312/293.2, 257.1, 265.5, 265.6; 361/809, 810, 825, 836, 725, 683

(56) References Cited

U.S. PATENT DOCUMENTS

| | | | |
|---|---|---|---|
| 3,915,530 | * 10/1975 | Anderson et al. ................. | 312/265.6 |
| 5,777,848 | * 7/1998 | McAnally et al. ................. | 361/683 |
| 5,816,673 | * 10/1998 | Sauer et al. ....................... | 312/223.1 |
| 5,865,518 | * 2/1999 | Jarrett et al. ...................... | 312/223.2 |
| 6,040,982 | * 3/2000 | Gandre et al. .................... | 312/223.2 |
| 6,116,063 | * 9/2000 | Foslien ............................. | 312/223.2 |

\* cited by examiner

Primary Examiner—Peter M. Cuomo
Assistant Examiner—Jerry A. Anderson
(74) Attorney, Agent, or Firm—Wei Te Chung

(57) ABSTRACT

A computer enclosure exclusively mounts two differently sized power supplies. The computer enclosure includes a rear panel having a first opening for directly mounting a first power supply, a base panel having a fixing portion near the first opening, and a mounting bracket having a second opening for mounting a second power supply to the rear panel. The second power supply has a smaller dimension than the first power supply. The mounting bracket is assembled with the second power supply. An electrical socket and venting holes of the second power supply is exposed to an exterior of the computer enclosure through the second opening. The assembly of the mounting bracket and the second power supply is mounted to the rear panel and the base panel. The second opening aligns with the first opening for connecting the socket of the second power supply with an outside power source and for exposing the venting holes to the exterior of the enclosure.

11 Claims, 6 Drawing Sheets

COMPUTER ENCLOSURE FOR EXCLUSIVELY MOUNTING TWO DIFFERENT SIZED SWITCHING POWER SUPPLIES

BACKGROUND OF THE INVENTION

1. Field of the Invention

The present invention relates to a computer enclosure, and particularly to a computer enclosure for exclusively mounting two different sized switching power supplies.

2. The Related Art

A power supply in a computer system is used for transforming the voltage value of local electrical power to an operational voltage for the computer system. For instance, local electrical power generally is an alternating current with a voltage value between 100 and 250 Volts. The electrical power used in a computer system is a direct current with a voltage usually under 12 Volts. Therefore, the local electrical power can not be used in the computer system directly. A switching power supply transforms the local electrical power and provides the computer system with a proper operational voltage. The switching power supply also distributes the electrical power to sub systems of the computer requiring different voltage levels, such as a CD-ROM drive, a floppy disk drive, a hard disk drive and a fan.

As shown in FIG. 1, a conventional computer enclosure 10 includes a rear panel 12 defining an opening 14 in an upper portion thereof for mounting a switching power supply 16 therein. The power supply 16 has a socket 18 and a plurality of venting holes 20 exposed to the opening 14. Several holes 22 are defined proximate the opening 14 and are aligned with corresponding holes 24 of the power supply 16 for screwing and fixing the power supply 16 to the computer enclosure 10. A supporting bracket 26 extending from an edge of the opening 14 supports the power supply 16. However, the conventional computer enclosure 10 can only accommodate a power supply of one predetermined size. Another power supply having a different dimension can not be mounted to the computer enclosure 10.

In the SFX Power Supply Design Guide, Version 1.0 Release, three kinds of power supplies having different dimensions are introduced, to be used with a Micro ATX motherboard. The power supply of a first dimension having a rectangular face with a width of 50 mm and a length of 100 mm is mated with the corresponding opening of the computer enclosure. The power supply of a second dimension has a rectangular mating face with a width of 63.5 mm and a length of 100 mm. The third power supply has a mating face with a width of 63.5 mm and a length of 113 mm. According to the specification of the Micro ATX motherboard, three different computer enclosures are needed for mounting the three different power supplies.

Conventional computer enclosures, such as the one shown in FIG. 1, can only mount one kind of power supply thereto. For mounting three different kinds of power supplies, three different computer enclosures are needed. Thus, three different kinds of tooling and molds are required for manufacturing the different computer enclosures. Under the same motherboard specifications, the three enclosures are slightly different regarding the power supply supporting bracket and the rear panel, which increases costs. Hence, a computer enclosure, which can exclusively mount different power supplies by means of a small modification of the enclosure, is requisite.

SUMMARY OF THE INVENTION

An object of the present invention is to provide a computer enclosure that can exclusively mount power supplies of different size.

Another object of the present invention is to provide a bracket for exclusively mounting a power supply to a computer enclosure which can mount a larger power supply.

The present invention discloses a computer enclosure which can exclusively mount two differently sized power supplies. The computer enclosure includes a rear panel having a first opening for directly mounting a first power supply, a base panel having a fixing portion near the first opening, and a mounting bracket having a second opening for mounting a second power supply thereto which is then fixed to the rear panel. The second power supply is smaller than the first power supply. The mounting bracket is assembled with the second power supply. An electrical socket and venting holes of the second power supply communicate with an exterior of the computer enclosure through the second opening. The assembly of the mounting bracket and the second power supply is mounted to the rear panel and the base panel. The second opening aligns with the first opening for connecting the socket of the second power supply with an outside power source and for exposing the venting holes to the exterior of the enclosure.

DETAIL DESCRIPTION OF THE PREFERRED EMBODIMENTS

The invention can apply to different computer systems, such as a personal computer, a workstation, and a server computer. For illustrating purposes, a personal computer is used for exclusively mounting two differently sized switching power supplies thereto.

Figure 1:
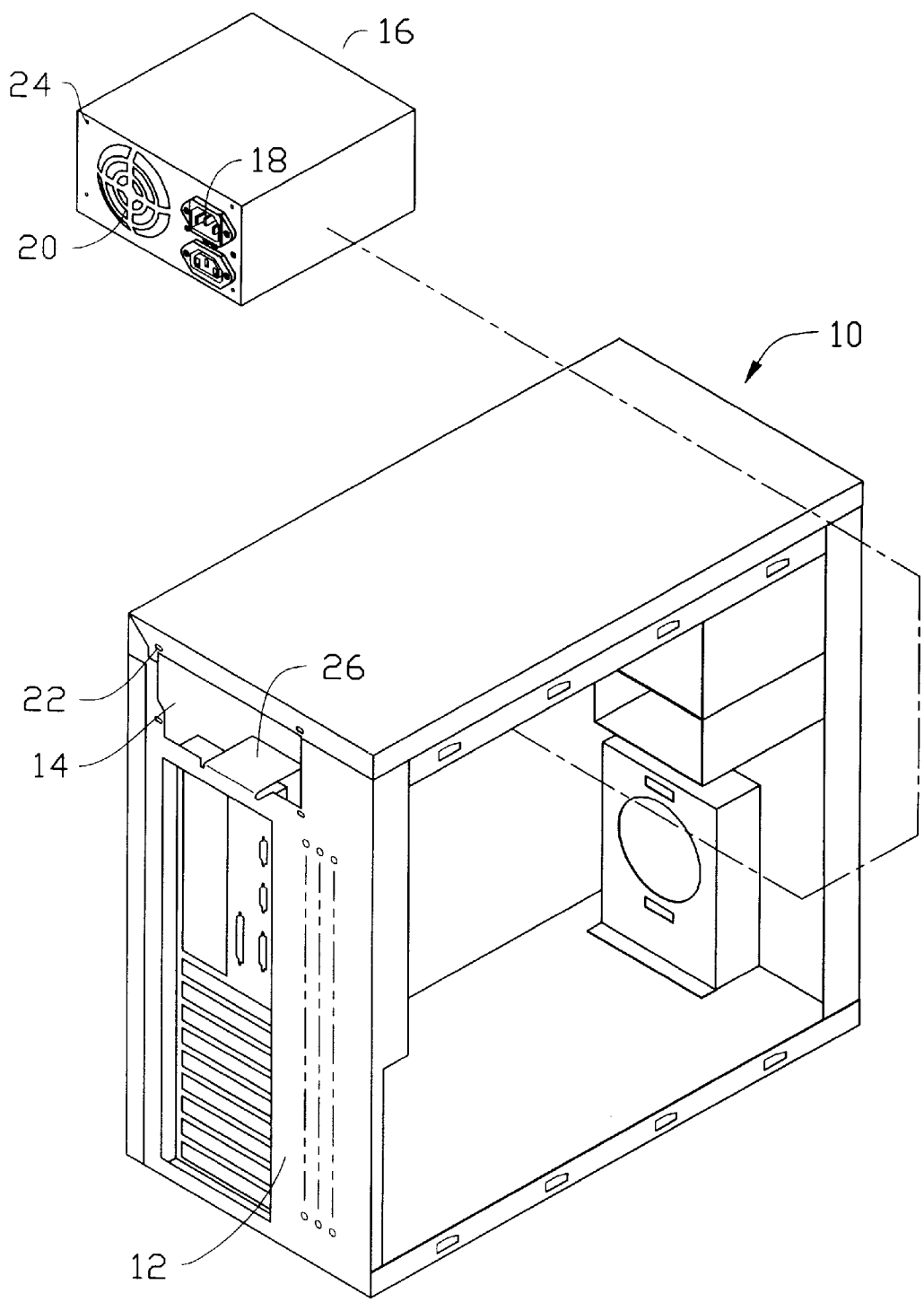
FIG. 1 is a perspective view of a conventional computer enclosure.
Figure 2:
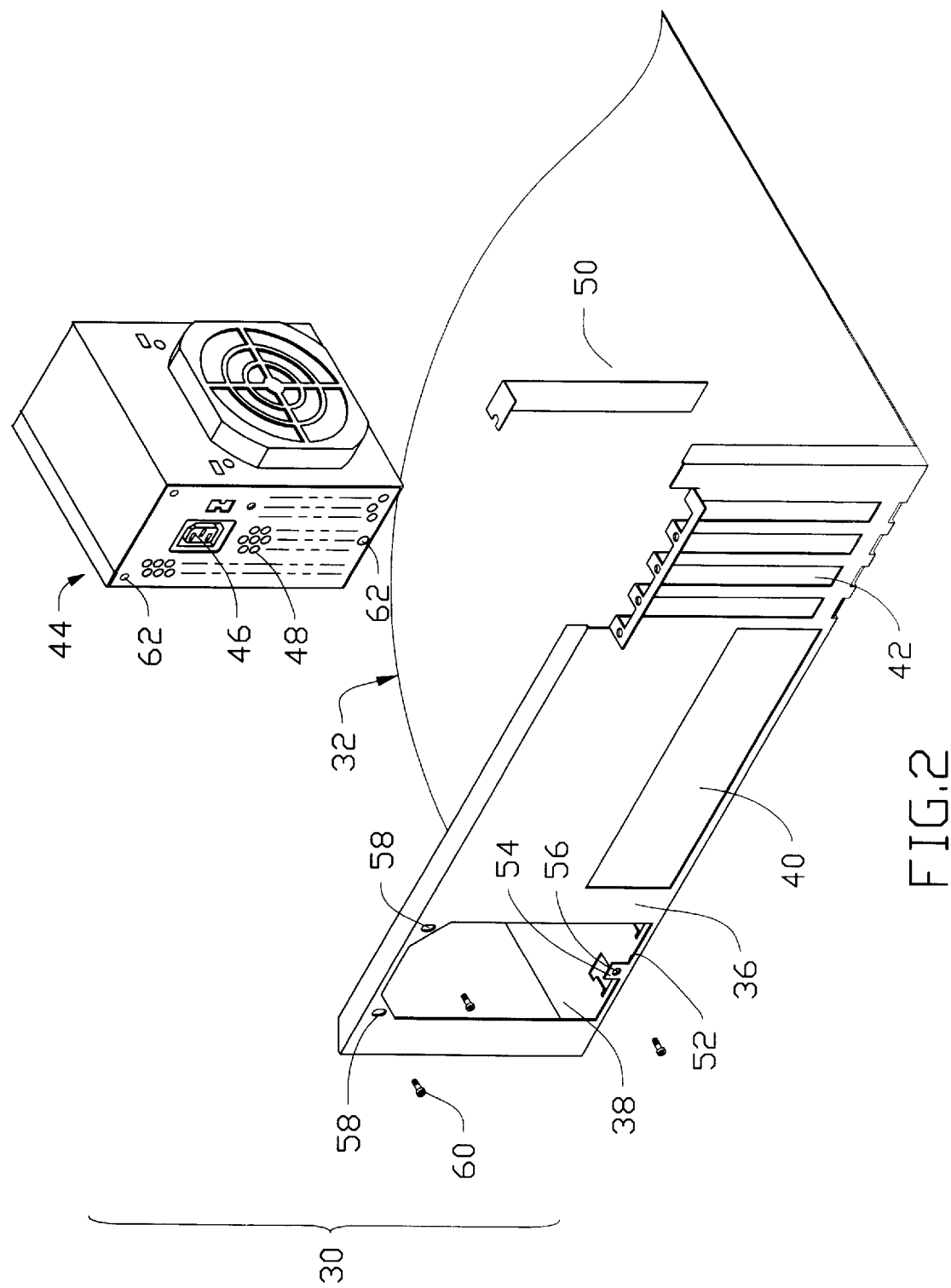
FIG. 2 is an exploded view showing a first switching power supply to be mounted to a computer enclosure in accordance with the present invention.
Figure 3:
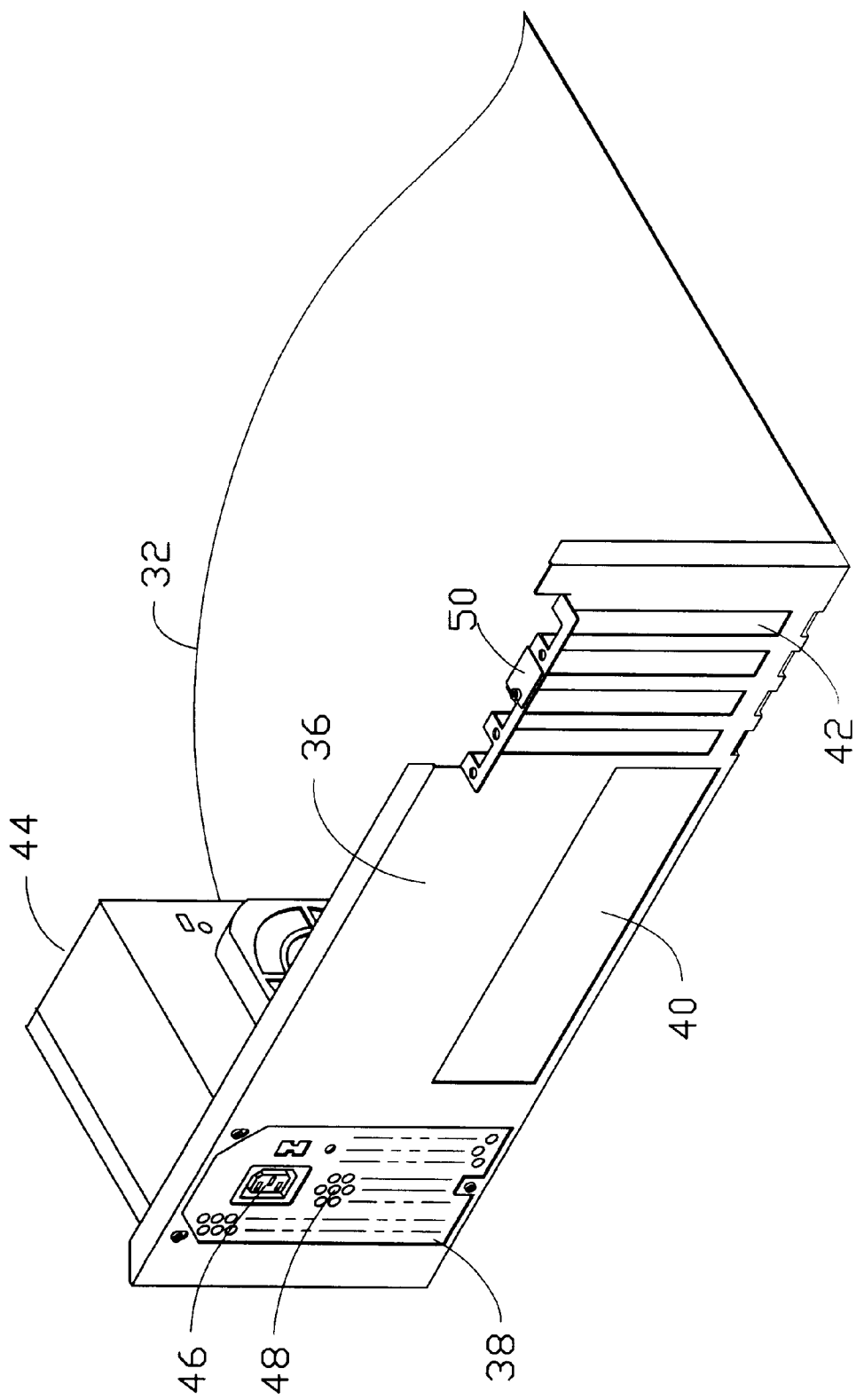
FIG. 3 is a partial perspective view showing the first switching power supply assembled to the computer enclosure.
Figure 4:
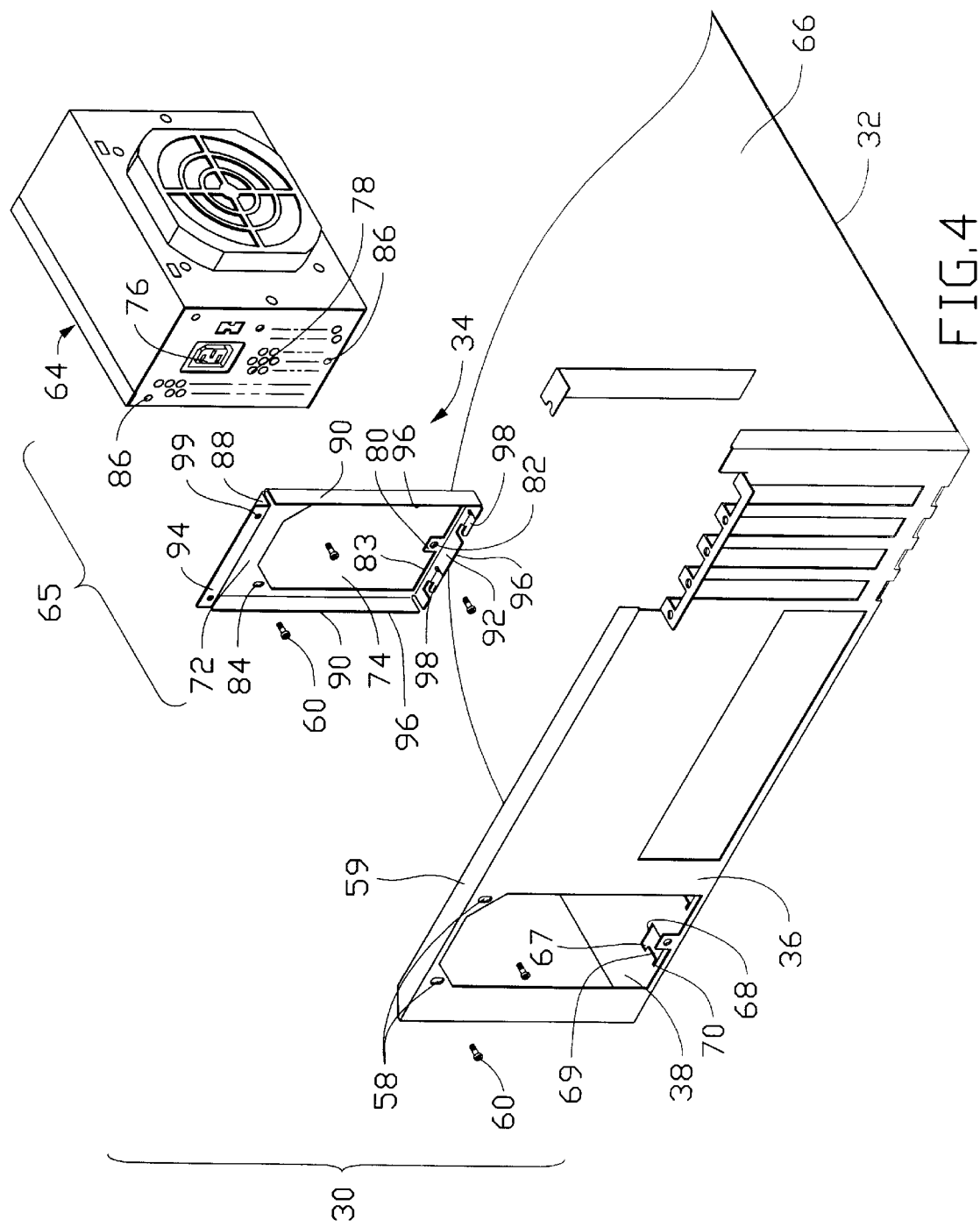
FIG. 4 is an exploded view showing a second switching power supply to be mounted to a computer enclosure by means of a mounting bracket in accordance with the present invention.
Figure 5B:
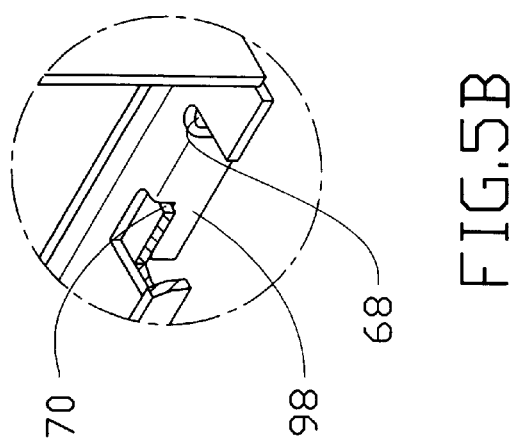
FIG. 5B is a partial, enlarged view of FIG. 5A.
Figure 5A:
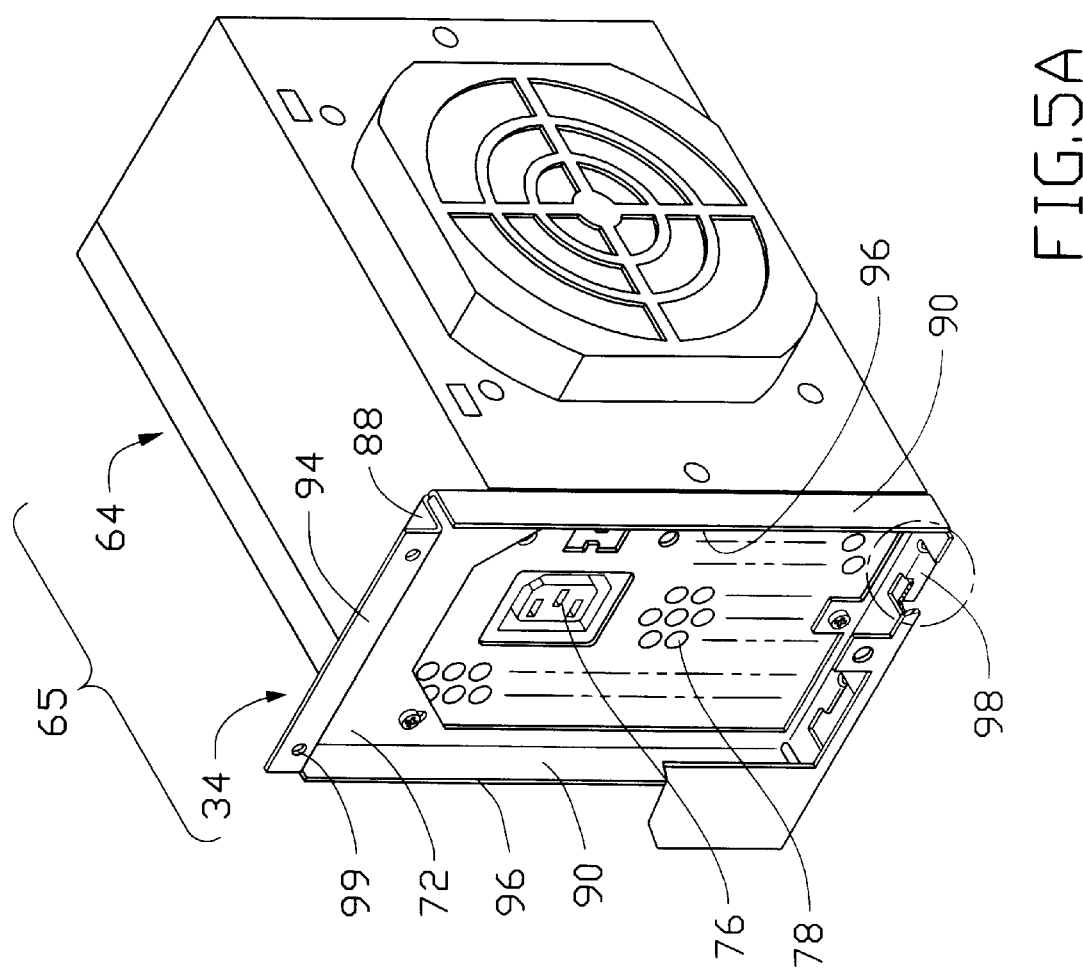
FIG. 5A is a perspective view showing the assembly of the second power supply and the mounting bracket.
Figure 6:
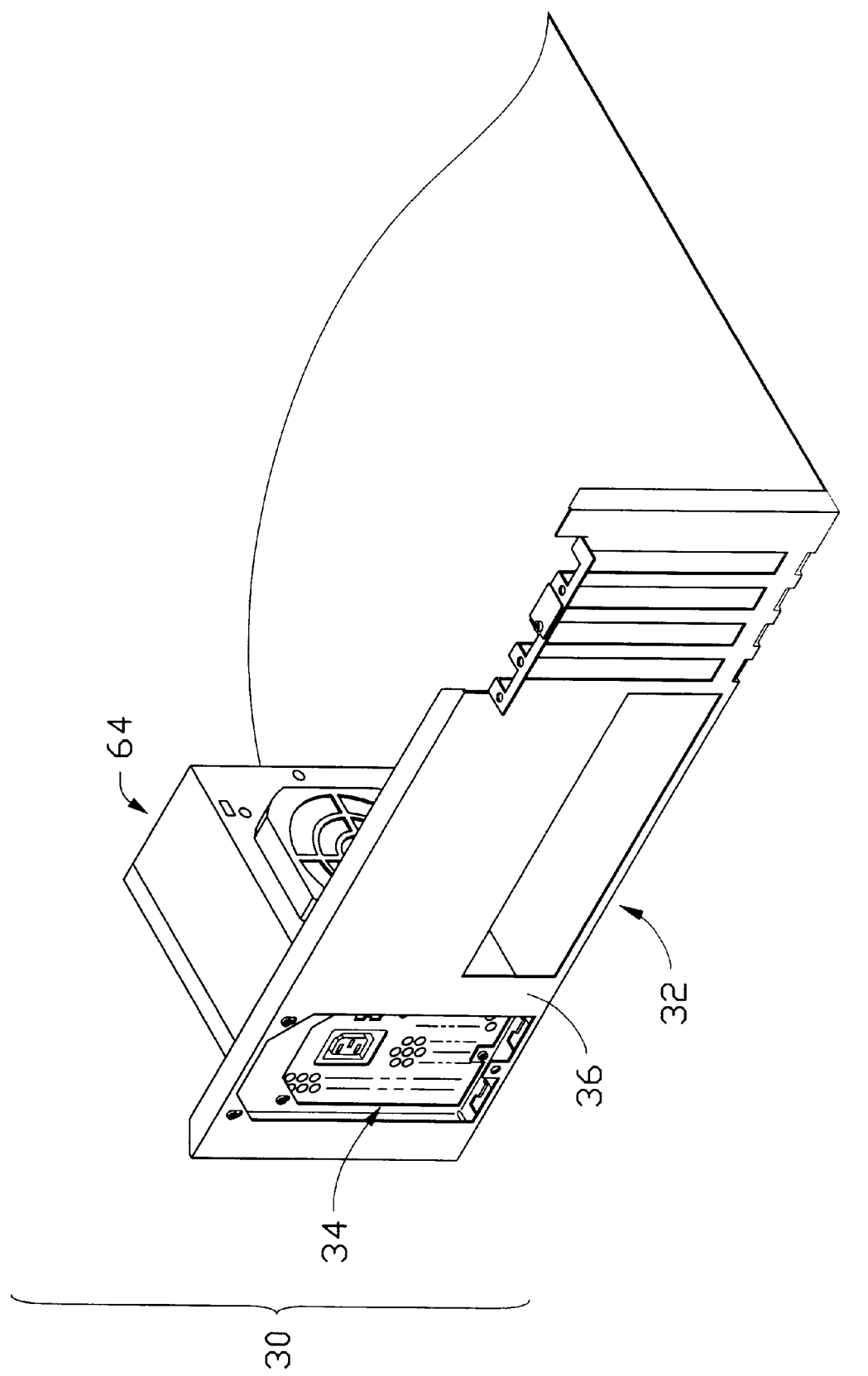
FIG. 6 is a perspective view showing the second switching power supply mounted to the computer enclosure.

Referring to FIGS. 2 and 3, a computer enclosure 30 has a top cover (not shown), a front bezel (not shown) and a chassis 32 which includes a rear panel 36 forming a first opening 38, an I/O port opening 40, and a plurality of slots 42. The I/O port opening 40 is used for mounting I/O connectors mounted on a motherboard (not shown) or a circuit board (not shown) for connecting with other computer peripherals. Each slot 42 is used for fixing an add-on card (not shown) by means of a slot cover 50 secured to one end of the add-on card for being screwed to and covering the corresponding slot 42. The first opening 38 is provided for directly mounting a first power supply 44 thereto. The first power supply 44 further has an electrical socket 46 and a plurality of venting holes 48. The socket 46 and holes 48 communicate with an exterior of the enclosure 30 through the first opening 38 for connecting with local electrical power and for providing heat dispersion capabilities, respectively. A tab 54 extends from a bottom edge 52 of the first opening 38 and a hole 56 is defined therein. Two holes 58 are symmetrically defined in the rear panel 36 proximate a top portion of the first opening 38. The first power supply 44 is fixed by means of screws 60 extending through the holes 56, 58 aligned with corresponding holes 62 of the first power supply 44.

Referring to FIGS. 4, 5A, 5B, and 6, the computer enclosure 30 further includes a mounting bracket 34. The mounting bracket 34 is used for mounting a second power supply 64 having a smaller dimension than the first power supply 44. The mounting bracket 34 and the second power supply 64 are assembled together to form a power supply assembly 65. The power supply assembly 65 is then mounted to the rear wall 36. A base panel 66 of the chassis 32 defines two mounting holes 68 near the first opening 38 for engaging with the mounting bracket 34.

The mounting bracket 34 forms a flat portion 72 which defines a second opening 74 which complies with the second power supply 64 and thus is somewhat smaller than the first opening 38. The second power supply 64 is mounted to the mounting bracket 34 and exposed through the second opening 74. The second power supply 64 includes an electrical socket 76 and a plurality of venting holes 78 exposed to an exterior of the computer enclosure 30 through the second opening 74 and the first opening 38 for connecting with local electrical power and providing heat dispersion capabilities, respectively. A tab 80 extends from a bottom edge 83 of the mounting bracket 34 into the second opening 74 and defines a hole 82 therein. Two holes 84 are symmetrically defined proximate a top portion of the second opening 74. Screws 60 extend through the holes 82, 84 of the mounting bracket 34 and holes 86 of the second power supply 64 to secure the second power supply 64 to the mounting bracket 34.

Along the periphery of the flat portion 72, the mounting bracket 34 forms a top flange 88, two side flanges 90 and a bottom flange 92. A stopper face 94 upwardly extends from the top flange 88, wherein the stopper face 94 is offset from the flat portion 72. The stopper face 94 defines two holes 99 corresponding to the holes 58 of the rear panel 36. The side flanges 90 and the bottom flange 92 form stopper edges 96 thereon which are coplanar with the stopper face 94. Each mounting hole 68 of the base panel 66 further defines a positioning portion 67, a sliding portion 69, and a slot 70. The bottom flange 92 further forms two downwardly extending hooks 98 for engaging with the corresponding slots 70 of the mounting holes 68 to fix the assembly of the bracket 34 and the second power supply 64 to the chassis 32. Each positioning portion 67 provides a space with a proper width for the hook 98 to extend therethrough. The sliding portion 69 is narrower than the positioning portion 67 for preventing the corresponding hook 98 from disengaging from the mounting hole 68. The bracket 34 moves along the sliding portion 69 until the stopper face 94 and the stopper edges 96 abut against an inner face of the rear panel 36. The bracket 34 can slide horizontally because a flange 59 of the rear panel 36 constrains an upper portion of bracket 34. The bracket 34 moves within the slots 70 and the hooks 98 engage with the slots 70 to fix the bracket 34 to the chassis 32.

When the assembly of the second power supply 64 and the bracket 34 is mounted to the chassis 32, the stopper face 94 and the stopper edge 96 abut against the inner face of the rear panel 36. The screws 60 extending through the aligned holes 58, 99 secure the bracket 34 to the chassis 32 thereby fixing the second power supply 64 to the computer enclosure 30.

The second opening 74 of the bracket 64 is exposed to the first opening 38 of the chassis 32, thus the electrical socket 76 and the venting holes 78 communicate with the exterior of the computer enclosure 30 for connecting with the local electrical power and providing heat dispersion capabilities, respectively.

While the present invention has been described in reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:

1. A computer enclosure having a chassis for exclusively mounting a first switching power supply and a second switching power supply having a smaller dimension than the first switching power supply thereto, comprising:

a rear panel formed on the chassis and defining a first opening for mounting the first switching power supply thereto;

a bracket releasably secured to the rear panel and defining a second opening aligning with the first opening of the rear panel for mounting the second switching power supply thereto.

2. The computer enclosure as described in claim 1, wherein the chassis further has a base panel perpendicular to the rear panel and defining at least one mounting hole proximate the first opening.

3. The computer enclosure as described in claim 2, wherein the bracket has at least one hook for engaging with the corresponding mounting hole of the base panel.

4. The computer enclosure as described in claim 3, wherein the mounting hole further defines a slot for engaging with the hook of the bracket.

5. The computer enclosure as described in claim 1, wherein the bracket forms at least one stopper edge for abutting against the rear panel.

6. The computer enclosure as described in claim 5, wherein the bracket forms a stopper face coplanar with the stopper edge for abutting against the rear panel.

7. The computer enclosure as described in claim 1, wherein a plurality of holes is defined in the rear panel proximate the first opening.

8. The computer enclosure as described in claim 7, wherein a plurality of holes is defined in the bracket proximate the second opening.

9. The computer enclosure as described in claim 8, wherein the holes of the rear panel align with the holes of the bracket for the extension of screws therethrough for mounting the bracket to the rear panel.

10. A computer enclosure having a chassis for exclusively mounting a first switching power supply and a second switching power supply having a smaller dimension than the first switching power supply thereto, comprising: p1 a rear panel formed on the chassis and defining a first larger opening with fastening means thereabouts for mounting the first switching power supply thereto; and a bracket releasably secured to the rear panel and defining a second smaller opening with thereabouts fastening means for mounting the second switching power supply thereto and attachment means for securing the said bracket to the rear panel.

11. A computer enclosure having a chassis for exclusively mounting a first switching power supply and a second switching power supply having a smaller dimension than the first switching power supply thereto, comprising:

a rear panel formed on the chassis and defining a first opening for mounting the first switching power supply thereto;

a bracket releasably secured to the rear panel and defining a second opening aligning with the first opening of the rear panel for mounting the second switching power supply thereto; wherein the chassis further has a base panel perpendicular to the rear panel and defining at least one mounting hole proximate the first opening, and the bracket has at least one hook for engaging with the corresponding mounting hole of the base panel.

* * * * *